United States Patent
Mandzak

(10) Patent No.: US 9,399,389 B2
(45) Date of Patent: Jul. 26, 2016

(54) REDUCED OFFSET LIFT-GATE APPLIQUE

(71) Applicant: Michael T Mandzak, Royal Oak, MI (US)

(72) Inventor: Michael T Mandzak, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 142 days.

(21) Appl. No.: 14/216,018

(22) Filed: Mar. 17, 2014

(65) Prior Publication Data

US 2015/0258879 A1    Sep. 17, 2015

(51) Int. Cl.
 B60J 5/10 (2006.01)

(52) U.S. Cl.
 CPC . B60J 5/107 (2013.01); B60J 5/101 (2013.01)

(58) Field of Classification Search
 CPC .............. B60J 5/10; B60J 5/101; B60J 5/102; B60J 5/107; B60R 13/04; B60R 13/043
 See application file for complete search history.

(56) References Cited

U.S. PATENT DOCUMENTS

| | | | | |
|---|---|---|---|---|
| 6,007,133 | A * | 12/1999 | Heim | B60J 5/101 296/146.9 |
| 7,618,084 | B2 * | 11/2009 | Kimura | B60J 5/101 296/146.11 |
| 8,646,829 | B2 * | 2/2014 | Crane | B60J 5/101 296/146.5 |
| 9,168,813 | B2 * | 10/2015 | Kasuya | B60R 13/043 |
| 2007/0145767 | A1 * | 6/2007 | Saitoh | B60J 5/101 296/146.5 |
| 2012/0153670 | A1 | 6/2012 | Crane et al. | |
| 2013/0076070 | A1 * | 3/2013 | Ogawa | B60R 19/34 296/187.11 |

FOREIGN PATENT DOCUMENTS

| | | | | |
|---|---|---|---|---|
| DE | 19938511 | A1 * | 2/2001 | ............ B60J 5/0481 |
| EP | 1120303 | A1 * | 8/2001 | ............ B60J 5/101 |
| FR | 2672017 | A1 * | 7/1992 | ............ B60J 5/101 |
| FR | 2819476 | A1 * | 7/2002 | ............ B62D 25/08 |
| FR | 2819477 | A1 * | 7/2002 | ............ B62D 25/08 |
| JP | 2005059781 | A * | 3/2005 | ............ B60J 5/101 |
| JP | 2007176359 | A * | 7/2007 | ............ B60J 5/101 |
| JP | 2007276606 | A * | 10/2007 | ............ B60R 13/04 |
| WO | WO 2007003831 | A1 * | 1/2007 | ............ B60R 19/18 |
| WO | WO 2008041475 | A1 * | 4/2008 | ............ B60R 13/04 |
| WO | WO 2008149023 | A2 * | 12/2008 | ............ B60J 5/102 |
| WO | WO 2011135798 | A1 * | 11/2011 | ............ B60R 13/04 |
| WO | WO 2013099699 | A1 * | 7/2013 | ............ B60J 5/101 |

* cited by examiner

*Primary Examiner* — Glenn Dayoan
*Assistant Examiner* — Paul Chenevert
(74) *Attorney, Agent, or Firm* — Ralph E. Smith

(57) ABSTRACT

A vehicle including a vehicle body having a bumper assembly and a lift-gate. The bumper assembly protrudes outward from the lift-gate when the lift-gate is in a closed position. A panel is attached to an outer surface of the lift-gate that reduces a distance that the bumper assembly protrudes outward from the lift-gate. The panel includes an attachment portion that fixedly secures the panel to the outer surface, and includes a deformable portion that releasably secures the panel to a terminal edge of the lift-gate. Upon receipt of an impact by the vehicle, the bumper assembly and the deformable portion are each operable to deform to absorb the impact and at least minimize transfer of the impact to the lift-gate.

10 Claims, 3 Drawing Sheets

US 9,399,389 B2

REDUCED OFFSET LIFT-GATE APPLIQUE

FIELD

The present disclosure relates to a vehicle liftgate or trunk lid including a decorative panel designed to absorb impacts to the lift-gate or trunk lid.

BACKGROUND

Vehicles have bumpers to absorb energy during impacts. In low speed impacts, for rear bumpers in particular, the bumper is designed to absorb the energy during the impact to assist in preventing the energy from being transferred to portions of the vehicle that include sheetmetal. For example, the rear bumper is designed to absorb the impact before the energy reaches the trunk lid, lift-gate, side panel, or rear tail lamps of a vehicle. This is because the cost to replace or repair the sheet metal forming these components can be expensive.

To prevent the energy of the impact from reaching, for example, the trunk or lift-gate of the vehicle, the trunk or lift-gate is generally offset from the bumper. In this manner, the bumper can absorb the impact before the energy reaches the trunk or lift-gate. This offset generally requires a pronounced styling feature in the trunk or lift-gate that, as vehicle styling has progressed, may be undesirable. The lift-gate, therefore, can be re-shaped or additional panels can be added that reduce the amount of off-set. With the reduced off-set, however, the lift-gate is more prone to be damaged in the event of an impact to the vehicle.

SUMMARY

The present disclosure provides a movable enclosure for a vehicle, the movable enclosure including an outer surface and comprising a panel attached to the outer surface, the panel including an attachment portion that fixedly secures the panel to the outer surface, and including a deformable portion that releasably secures the panel to a terminal edge of the movable enclosure, wherein upon receipt of an impact by the panel, the deformable portion is operable to deform to minimize transfer of the impact to the movable enclosure.

The present disclosure also provides a vehicle including a vehicle body including a bumper assembly and a movable enclosure. The movable enclosure includes an upper portion pivotably secured to the vehicle body and a lower portion positioned proximate the bumper assembly when the movable enclosure is in a closed position. The bumper assembly protrudes outward from the movable enclosure when the movable enclosure is in the closed position. A panel is attached to an outer surface of the movable enclosure at the lower portion that reduces a distance that the bumper assembly protrudes outward from the movable enclosure. The panel includes an attachment portion that fixedly secures the panel to the outer surface, and includes a deformable portion that releasably secures the panel to a terminal edge of the movable enclosure. Upon receipt of an impact by the vehicle, the bumper assembly and the deformable portion are each operable to deform to absorb the impact and at least minimize transfer of the impact to the movable enclosure.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
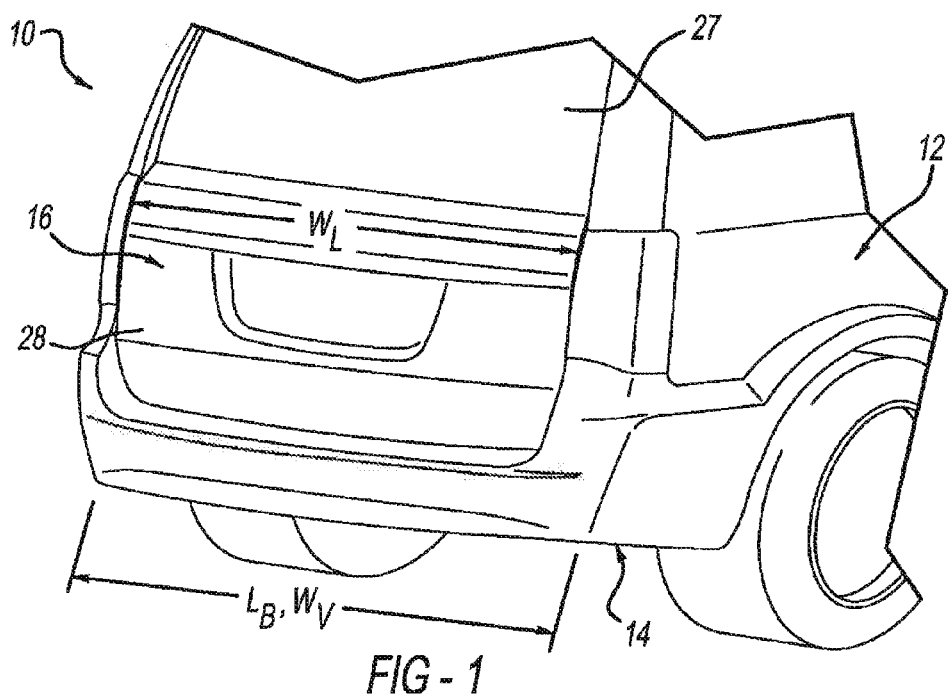
FIG. 1 is a perspective view of a conventional rear bumper and lift-gate of an exemplary vehicle.
Figure 2:
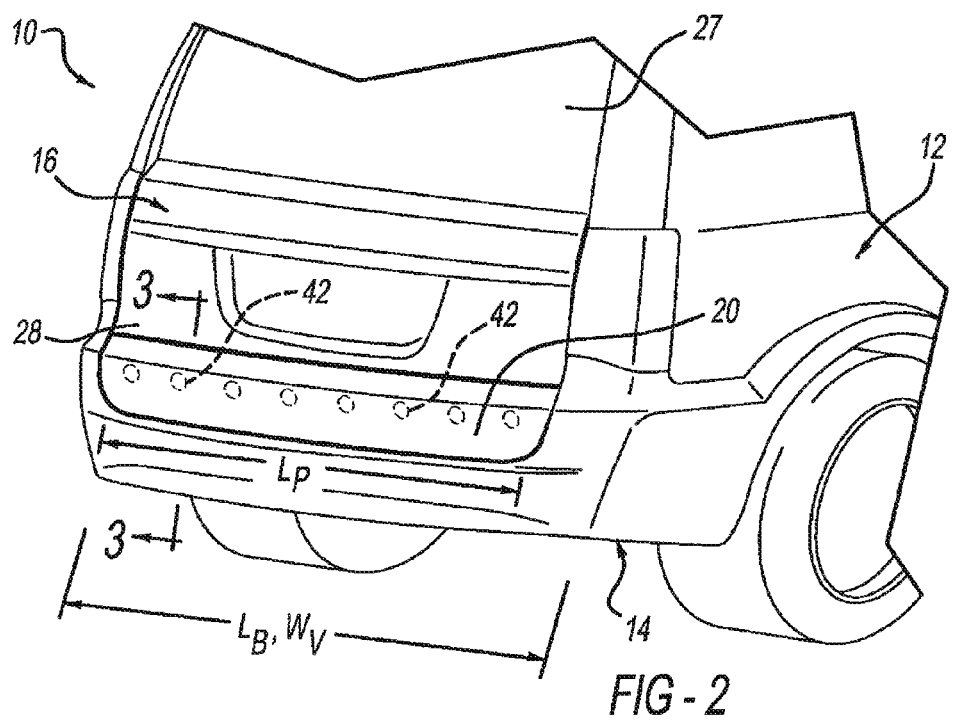
FIG. 2 is a perspective view of a rear bumper and lift-gate of an exemplary vehicle according to a principle of the present disclosure.
Figure 3:
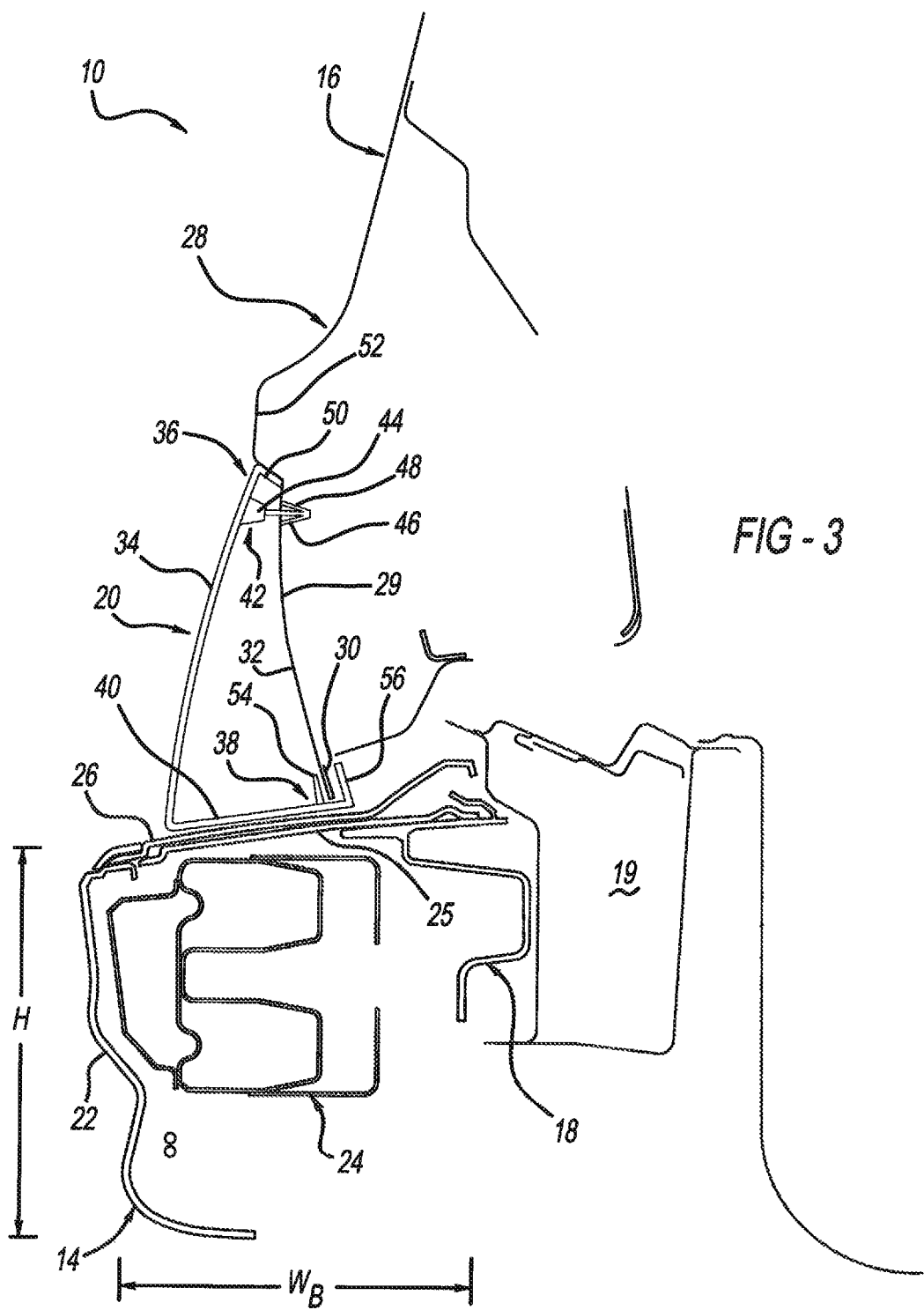
FIG. 3 is a cross-sectional view of an exemplary lift-gate and bumper according to a principle of the present disclosure.
Figure 4:
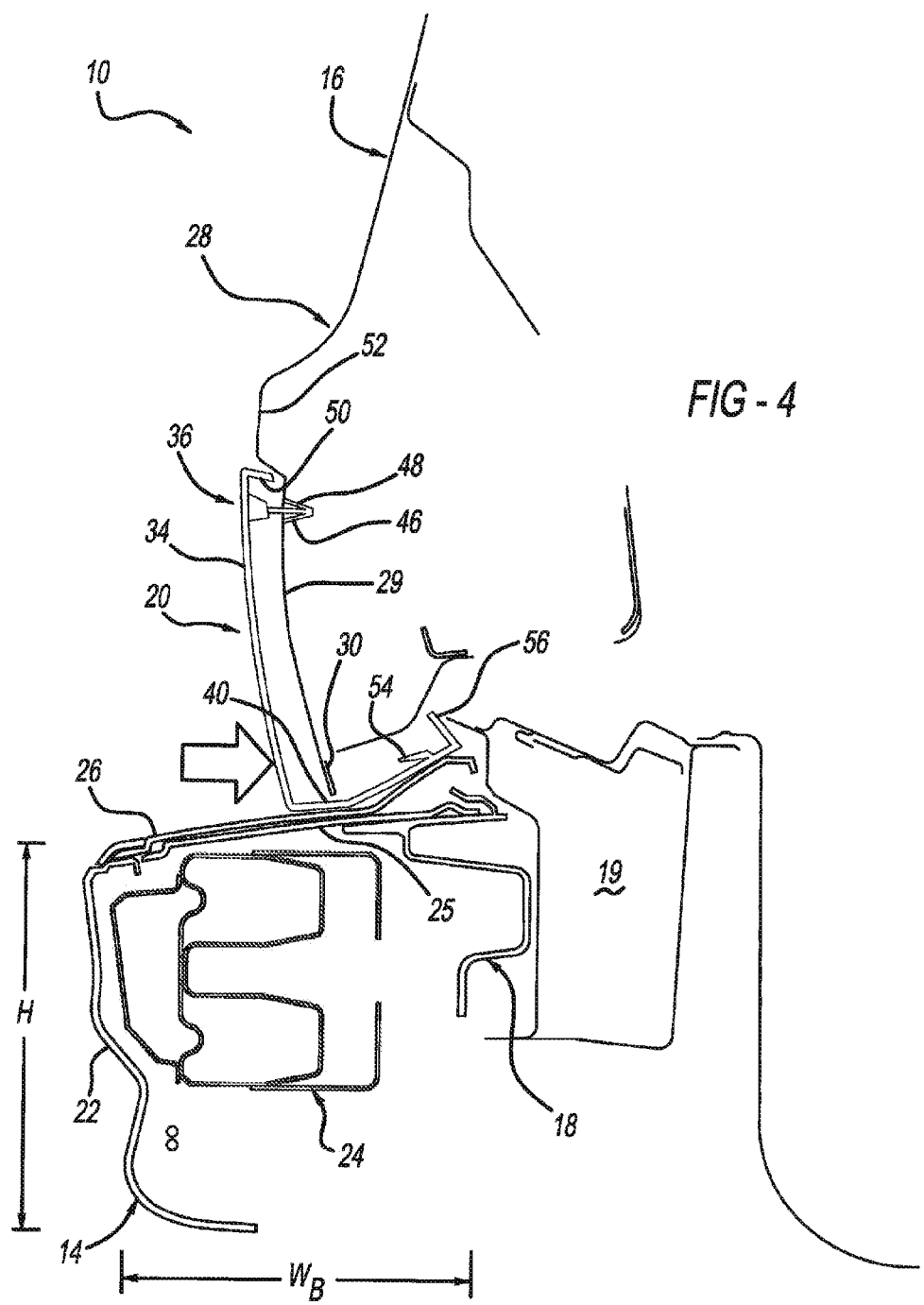
FIG. 4 is a cross-sectional view of the lift-gate and bumper illustrated in FIG. 4, after an impact to the bumper and lift-gate.

FIGS. 1-4 illustrate an exemplary vehicle 10. Vehicle 10 includes a vehicle body 12 including a bumper assembly 14 and movable enclosure 16 such as a lift-gate or trunk lid (hereinafter "lift-gate"). Lift-gate 16 is operable to open and close in a vertical manner, as is known in the art. Bumper assembly 14 includes a length $L_B$ substantially equal to width $W_V$ of vehicle 10. Bumper 14 further includes a width $W_B$ and a height H (FIGS. 3 and 4). Bumper 14 is connected to a bracket 18 of vehicle according to known methods. As is known in the art, bumper assembly 14 is designed to absorb low velocity impacts to a rear of vehicle 10 such that energy of the impact is impeded from deforming a body structure 19 of vehicle 10. As best illustrated in FIG. 1, bumper assembly 14 protrudes outward from lift-gate 16 such that any low velocity impact (e.g., less than 15 mph) is sufficiently absorbed by bumper assembly 14 and prevented from reaching lift-gate 16.

Bumper assembly 14 protrudes outward from lift-gate 16. Bumper assembly 14, therefore, is visually pronounced relative to lift-gate 16. As vehicle styling has evolved, however, it has become desirable that bumper assembly 14 is less pronounced relative to lift-gate 16. To reduce the offset of bumper assembly 14 relative to lift-gate 16, the present disclosure provides a panel 20 connected to lift-gate 16 that reduces the visual pronouncement of bumper assembly 14 relative to lift-gate 16 (FIG. 2).

Now referring to FIGS. 3 and 4, bumper assembly 14 includes an outer fascia 22, which covers and houses the impact-absorbing structure 24 of bumper assembly 14. Impact-absorbing structure 24 is generally formed from steel or aluminum, and includes foams or engineered plastics therein to assist in absorbing energy from an impact thereto. An upper fascia 25 extends inward from outer fascia 22 and connects to bracket 18. A scuff plate 26 covers each of outer fascia 22 and upper fascia 25.

Lift-gate 16 includes an upper portion 27 pivotably secured to vehicle body 12 and a lower portion 28 that terminates at a lift-gate seal flange 30. In other words, lower portion 28 is positioned proximate bumper assembly 14 when lift-gate 16 is in a closed position. As lower portion 28 approaches bumper assembly 14, lower portion tapers 28 away at 29 from outer fascia 22 of bumper assembly 14 toward bracket 18 to avoid absorption of any impact that bumper 12 receives. Because lower portion 28 tapers away at 29 from outer fascia 22, the pronounced styling of bumper assembly 14 relative to lift-gate 16 is formed. To reduce the pronounced styling of bumper assembly 14 relative to lift-gate 16, panel 20 is fixed to lift-gate 16. Panel 20, therefore, forms a part of lift-gate 16 that reduces the offset of bumper assembly 14 relative to lift-gate 16.

Panel 20 is attached to an outer surface 32 of lift-gate 16 at lower portion 28. As best illustrated in FIG. 2, panel 20 includes a length $L_P$ that extends substantially along the entire width $W_L$ of lift-gate 16. Panel 20 includes a decorative exterior surface 34, an attachment portion 36 that fixedly secures panel 20 to lift-gate 16, and a deformable portion 38 that receives a terminal edge or lift-gate seal flange 30 in a slip-fit manner. A lower portion 40 that connects exterior surface 34 and deformable portion 38 is arranged substantially parallel to scuff plate 26 of bumper assembly 14 when lift-gate 16 is in the closed position. Exterior surface 34, attachment portion 36, deformable portion 38, and lower portion 40 are preferably unitary in construction. It should be understood, however, that each of these components may be separately formed and subsequently attached without departing from the scope of the present disclosure.

Attachment portion 36 is fixedly secured to outer surface 32 of lift-gate 16 by a plurality of fasteners 42. Fasteners 42 can be embodied as screws, bolts or the like. Alternatively, as illustrated, fasteners 42 are integrally formed with panel 20 and include a base member 44 and an anchor member 46 extending from base member. Anchor members 46 include deflectable ears 48 that are designed to deflect inward upon entry into corresponding apertures (not shown) formed in outer surface 32 of lift-gate 16, and then expand after passing through the apertures to fixedly secure panel 20 to lift-gate 16. Attachment portion 36 also includes an abutment flange 50 that is designed and shaped to abut an ornamental contour 52 of lift-gate 16. It should be understood, however, that abutment flange 50 is not required by the present disclosure. Regardless, it should be understood that abutment flange 50 may also be configured to include fasteners 42 rather than fasteners 42 extending from exterior surface 34 of panel 20.

Deformable portion 38 is defined by a pair of elongate flanges 54 and 56 that extend upwardly from lower portion 40. Flanges 54 and 56 extend along an entire length $L_P$ of panel 20, and are designed to receive lift-gate seal flange 30 of lift-gate 16 therebetween. Although lift-gate seal flange 30 is illustrated as being spaced apart from each of flanges 54 and 56, it should be understood that lift-gate seal flange 30 is preferably slip-fit between flanges 54 and 56 such that lift-gate seal flange 30 is in releasable contact with each of flanges 54 and 56. Regardless, it is contemplated that lift-gate seal flange 30 can be spaced apart from flanges 54 and 56.

Flange 54 is designed to deform, or be sheared off from panel 20, in the event of an impact thereto. That is, upon receipt of a low velocity impact (e.g., less than 5 mph) to vehicle 10 that reaches panel 20, flange 54 is configured to deform to minimize transfer of the impact to lift-gate 16. Panel 20 is only fixedly secured to lift-gate 16 at attachment portion 36. Accordingly, as best shown in FIG. 4, panel 20 will pivot at attachment portion 36 toward lift-gate 16 in the event of an impact to panel 20 that deforms or shears off flange 54. Such a configuration assists in preventing, or at least substantially minimizing, damage to lift-gate 16 during low velocity impacts to vehicle 10. In contrast, if panel 20 was fixed to lift-gate without deformable portion 38 (i.e., if deformable portion 38 was replaced with a second attachment portion such that panel 20 was fixed to lift-gate 16 at each attachment portion), the deformation of panel 20 would be directly transferred to lift-gate 16 which could ultimately result in damage to lift-gate 16 that requires replacement or repair of lift-gate 16. Because lift-gate 16 is substantially more costly to replace or repair in comparison to the mere replacement of panel 20, panel 20 is designed to include deformable portion 38 that allows panel 20 to deform rather than transfer the impact to lift-gate 16.

To ensure that panel 20 including deformable portion 38 deforms upon impact rather than transfer the impact to lift-gate 16, panel 20 is formed from materials that are not as rigid as lift-gate 16. For example, panel 20 is formed from injection-molded plastics or sheet molded composites. In general, lift-gate 16 is formed from steel. Alternatively, life-gate 16 is formed from metal materials such as aluminum, steel, magnesium, and alloys thereof. If panel 20 is also formed from a metal, flange 54 preferably has a thickness less than that of the lift-gate 16 to ensure deformation thereof in the event of an impact. Alternatively, flange 54 can be connected to lower portion 40 via serrations (not shown) that more easily allow flange 54 to deform, if necessary.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
    a vehicle body including a bumper assembly and a movable enclosure, the movable enclosure including an upper portion pivotably secured to the vehicle body and a lower portion positioned proximate the bumper assembly when the movable enclosure is in a closed position, the bumper assembly protruding outward from the movable enclosure when the movable enclosure is in the closed position; and
    a panel attached to an outer surface of the movable enclosure at the lower portion that reduces a distance that the bumper assembly protrudes outward from the movable enclosure, the panel including an attachment portion that fixedly secures the panel to the outer surface, and including a deformable portion that releasably secures the panel to a terminal edge of the movable enclosure,
    wherein upon receipt of an impact by the vehicle, the bumper assembly and the deformable portion are each operable to deform to absorb the impact and at least minimize transfer of the impact to the movable enclosure.

2. The vehicle of claim 1, wherein the panel includes a decorative exterior surface located between the attachment portion and the deformable portion.

3. The vehicle according to claim 1, wherein the panel is formed from one material selected from the group consisting of steel, aluminum, magnesium, and plastic.

4. The vehicle of claim 1, wherein the attachment portion is fixedly secured to the outer surface by a plurality of fasteners.

5. The vehicle of claim 4, wherein the fasteners are unitary with the panel.

6. The vehicle of claim 4, wherein the fasteners each include deflectable ears.

7. A vehicle comprising:
    a vehicle body including a bumper assembly and a movable enclosure, the movable enclosure including an upper portion pivotably secured to the vehicle body and a lower portion positioned proximate the bumper assembly when the movable enclosure is in a closed position, the bumper assembly protruding outward from the movable enclosure when the movable enclosure is in the closed position; and a panel attached to an outer surface of the movable enclosure at the lower portion that reduces a distance that the bumper assembly protrudes outward from the movable enclosure, the panel including an attachment portion that fixedly secures the panel to the outer surface, and including a deformable portion that releasably secures the panel to a terminal edge of the movable enclosure, wherein upon receipt of an impact by the vehicle, the bumper assembly and the deformable portion are each operable to deform to absorb the impact and at least minimize transfer of the impact to the movable enclosure and, wherein the deformable portion is defined by a pair of elongate flanges that receive the terminal edge of the movable enclosure there between.

8. The vehicle according to claim 7, wherein the at least one flange has a thickness less than a thickness of the terminal edge of the movable enclosure.

9. The vehicle of claim 7, wherein upon receipt of the impact to the panel, at least one of the flanges is configured to deform to absorb the impact and allow the panel to pivot relative to the movable enclosure to minimize transfer of the impact to the movable enclosure.

10. The vehicle of claim 9, wherein the at least one flange is configured to be sheared off from the panel.

* * * * *